US009513369B2

(12) United States Patent
Minowa et al.

(10) Patent No.: US 9,513,369 B2
(45) Date of Patent: Dec. 6, 2016

(54) RADAR DEVICE AND VELOCITY CALCULATION METHOD

(71) Applicant: FURUNO Electric Company Limited, Nishinomiya, Hyogo (JP)

(72) Inventors: Masahiro Minowa, Nishinomiya (JP); Yasunobu Asada, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 442 days.

(21) Appl. No.: 14/058,665

(22) Filed: Oct. 21, 2013

(65) Prior Publication Data

US 2014/0118184 A1 May 1, 2014

(30) Foreign Application Priority Data

Oct. 30, 2012 (JP) .................................. 2012-239295

(51) Int. Cl.
*G01S 13/58* (2006.01)
*G01S 13/22* (2006.01)
*G01S 13/95* (2006.01)

(52) U.S. Cl.
CPC ............ *G01S 13/589* (2013.01); *G01S 13/227* (2013.01); *G01S 13/581* (2013.01); *G01S 13/95* (2013.01)

(58) Field of Classification Search
CPC ...................................................... G01S 13/589
See application file for complete search history.

(56) References Cited

U.S. PATENT DOCUMENTS 4,816,833 A * 3/1989 Ferguson ................. G01S 13/20
342/108
5,027,122 A * 6/1991 Wieler ................... G01S 13/227
342/26 D
5,442,359 A * 8/1995 Rubin ...................... G01S 13/30
342/109

(Continued)

FOREIGN PATENT DOCUMENTS

JP 2006-226955 A 8/2006
JP 2008-501289 A 1/2008

(Continued)

OTHER PUBLICATIONS

Grant Gray, Brian Lewis, Joseph Vinson, and Frank Pratte. "A Real-Time Implementation of Staggered PRT Velocity Unfolding", Journal of Atmospheric and Oceanic Technology. vol. 6, Issue 1. 1989. pp. 186-187, doi: http://dx.doi.org/10.1175/1520-0426(1989)006<0186:ARTIOS>2.0.CO;2.*

(Continued)

*Primary Examiner* — Matthew M Barker
(74) *Attorney, Agent, or Firm* — Global IP Counselors, LLP

(57) ABSTRACT

It is an object of the present invention to provide a radar device and a velocity calculation method with which velocity can be calculated more accurately. A radar device 1 comprises a transmitter 23, a first velocity calculator 31a, a second velocity calculator 31b, a first velocity corrector 33a, and a second velocity corrector 33b. The transmitter 23 transmits pulse signals at two or more different pulse repetition frequencies. The first velocity calculator 31a calculates a first Doppler velocity based on a first received signal. The second velocity calculator 31b calculates a second Doppler velocity based on a second received signal. The first velocity corrector 33a calculates a first corrected Doppler velocity by folding correction of the first Doppler velocity. The second velocity corrector 33b calculates a second corrected Doppler velocity by folding correction of the second Doppler velocity.

6 Claims, 9 Drawing Sheets

(56) References Cited

U.S. PATENT DOCUMENTS 6,097,329 A * 8/2000 Wakayama ............. G01S 13/22
342/104
7,605,744 B1 * 10/2009 Karhunen ............... G01S 13/22
342/112

FOREIGN PATENT DOCUMENTS

JP   2011-203176 A   10/2011
WO   2005-117278 A1  12/2005

OTHER PUBLICATIONS

Zrnc, D.; Mahapatra, P., "Two Methods of Ambiguity Resolution in Pulse Doppler Weather Radars," in Aerospace and Electronic Systems, IEEE Transactions on, vol.AES-21, No. 4, pp. 470-483, Jul. 1985. doi: 10.1109/TAES.1985.310635.*

Hideo Adachi and Yuko Sato, Doppler Weather Radar, Toshiba Review, vol. 55, No. 5 (2000), pp. 27-30, Japan.

Office Action of the corresponding Japanese Patent Application No. 2012-239295, dated Jun. 28, 2016.

* cited by examiner

RADAR DEVICE AND VELOCITY CALCULATION METHOD

CROSS-REFERENCE TO RELATED APPLICATIONS

This application claims priority to Japanese Patent Application No. 2012-239295 filed on Oct. 30, 2012. The entire disclosure of Japanese Patent Application No. 2012-239295 is hereby incorporated herein by reference.

BACKGROUND

Field of the Invention

The present invention relates to a radar device and a velocity calculation method with which Doppler velocity can be calculated more accurately.

Background Information

A radar device for detecting the velocity of a target, such as rain or clouds, transmits a plurality of pulse signals and calculates the velocity from the amount of phase rotation of an echo signal reflected by the target. This radar device is only able to calculate a velocity at which the Doppler frequency is less than the pulse repetition frequency (PRF), and if the target velocity is high, the Doppler frequency between pulses may exceed the PRF, which is the observation limit. When this happens, so-called "folding" occurs, in which the calculated velocity is observed as being lower than the actual velocity, and this makes it impossible to calculate the velocity accurately.

To regard to this, Non-Patent Literature 1 (H. Adachi and Y. Sato, "Doppler Weather Radar," Toshiba Review, Vol. 55, No. 5 (2000), pp. 27-30) has disclosed a method with which the actual velocity can be calculated even if folding occurs. With this method, pulse signals are alternately transmitted at two pulse repetition frequencies. The number of folds is determined from the difference in velocity obtained at the two pulse repetition frequencies, and the corrected velocity is calculated based on this number of folds.

SUMMARY

As discussed above, a velocity close to the actual velocity can be calculated by performing folding correction based on the number of folds, but it would be desirable to be able to calculate velocities at higher accuracy. In view of this, it is an object of the present invention to provide a radar device and a velocity calculation method with which velocity can be calculated more accurately.

(1) To solve the above problem, the radar device pertaining to an aspect of the present invention comprises a transmitter, a first velocity calculator, a second velocity calculator, a first velocity corrector, and a second velocity corrector. The transmitter is configured to transmit pulse signals at two or more different pulse repetition frequencies. The first velocity calculator is configured to calculate a first Doppler velocity based on a first received signal received as a reflected wave of the pulse signals transmitted at a first pulse repetition frequency. The second velocity calculator is configured to calculate a second Doppler velocity based on a second received signal received as a reflected wave of the pulse signals transmitted at a second pulse repetition frequency. The first velocity corrector is configured to calculate a first corrected Doppler velocity by folding correction of the first Doppler velocity based on a velocity difference between the first Doppler velocity and the second Doppler velocity. The second velocity corrector is configured to calculate a second corrected Doppler velocity by folding correction of the second Doppler velocity based on the velocity difference.

(2) Preferably, the radar device further comprises an average velocity calculator that is configured to calculate an average velocity based on the first corrected Doppler velocity and the second corrected Doppler velocity.

(3) Preferably, the transmitter is further configured to transmit the pulse signals at two different pulse repetition frequencies.

(4) Preferably, the transmitter is further configured to alternately transmit the pulse signals that are transmitted at the first pulse repetition frequency and the pulse signals that are transmitted at the second pulse repetition frequency.

(5) Preferably, at least one of the first velocity calculator and the second velocity calculator is configured to calculate corresponding one of the first Doppler velocity and the second Doppler velocity by pulse-pair method.

(6) To solve the above problem, the radar device pertaining to another aspect of the present invention comprises a transmitter, a first phase difference calculator, a second phase difference calculator, a first velocity corrector, and a second velocity corrector. The transmitter is configured to transmit pulse signals at two or more different pulse repetition frequencies. The first phase difference calculator is configured to calculate a first phase difference between first received signals received as a reflected wave of the pulse signals transmitted at a first pulse repetition frequency. The second phase difference calculator is configured to calculate a second phase difference between second received signals received as a reflected wave of the pulse signals transmitted at a second pulse repetition frequency. The first velocity corrector is configured to calculate a first corrected Doppler velocity based on the first phase difference and a phase rotation number determined based on a difference between the first phase difference and the second phase difference. The second velocity corrector is configured to calculate a second corrected Doppler velocity based on the second phase difference and the phase rotation number.

(7) To solve the above problem, the Doppler velocity calculation method pertaining to an aspect of the present invention includes the following steps (a) to (e). Step (a) involves transmitting pulse signals at two or more different pulse repetition frequencies. Step (b) involves calculating a first Doppler velocity based on a first received signal received as a reflected wave of the pulse signals transmitted at a first pulse repetition frequency. Step (c) involves calculating a second Doppler velocity based on a second received signal received as a reflected wave of the pulse signals transmitted at a second pulse repetition frequency. Step (d) involves calculating a first corrected Doppler velocity by folding correction of the first Doppler velocity based on a velocity difference between the first Doppler velocity and the second Doppler velocity. Step (e) involves calculating a second corrected Doppler velocity by folding correction of the second Doppler velocity based on the velocity difference.

The present invention provides a radar device and a velocity calculation method with which velocity can be calculated more accurately.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

The radar device and velocity calculation method pertaining to the present invention will now be described through reference to the drawings. A watercraft equipped with a radar device will hereinafter be referred to as a "host vessel."

Figure 1:
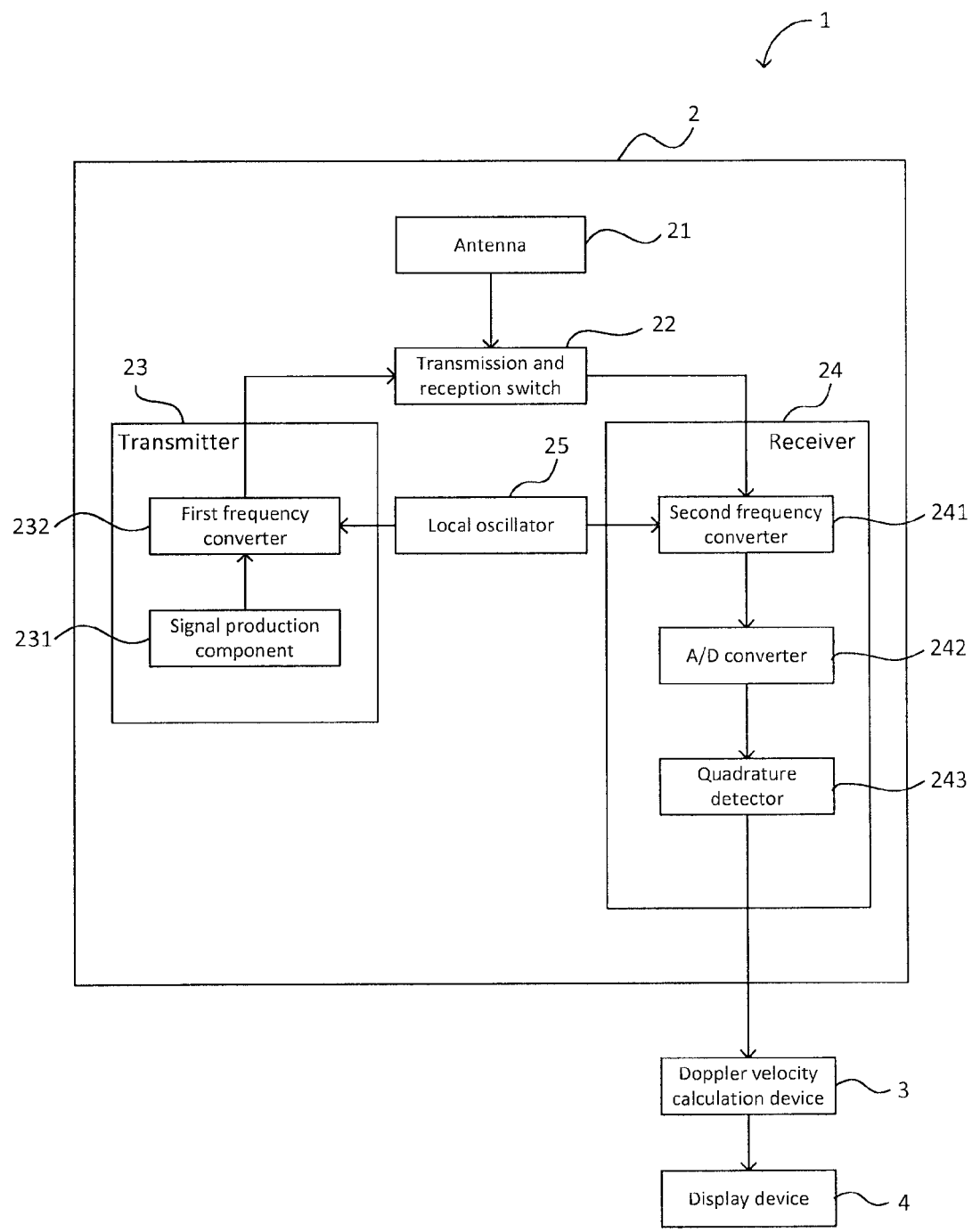
FIG. 1 is a block diagram of the configuration of the radar device pertaining to an embodiment of the present invention.

FIG. 1 is a block diagram of the configuration of the radar device 1 pertaining to this embodiment. As shown in FIG. 1, the radar device 1 pertaining to this embodiment comprises an antenna unit 2, a Doppler velocity calculation device 3, and a display device 4.

Antenna Unit 2

The antenna unit 2 comprises an antenna 21, a transmission and reception switch 22, a transmitter 23, a receiver 24, and a local oscillator 25.

The antenna 21 transmits pulsed radio waves having directionality, and is configured so as to receive received signals including reflected waves (echo signals) from a target. The radar device 1 can ascertain the distance to a target by measuring how long it takes to receive an echo signal after a pulsed radio wave is sent by the antenna 21. The antenna 21 is also configured so as to be capable of rotating 360 degrees in the horizontal plane, and is configured so as to repeatedly send and receive radio waves while varying the transmission direction of the pulsed radio waves. The orientation of a target is found from the orientation of the antenna 21 when the corresponding transmission signal is sent out. The above configuration allows targets to be detected for 360 degrees around the plane surrounding the host vessel.

The transmission and reception switch 22 switches to a connection by which a transmission signal is sent from the transmitter 23 to the antenna 21 during transmission. During reception, the transmission and reception switch 22 switches to a connection by which an echo received by the antenna 21 is sent from the antenna 21 to the receiver 24.

The transmitter 23 has a signal production component 231 and a first frequency converter 232. The signal production component 231 produces pulse signals and outputs them to the first frequency converter 232 so that pulse signals will be sent at two different pulse repetition frequencies. More precisely, the signal production component 231 alternately produces a pulse signal that is sent at a first pulse repetition frequency (PRF1) and a pulse signal that is sent at a second pulse repetition frequency (PRF2).

The first frequency converter 232 converts the frequency by mixing the pulse signal outputted from the signal production component 231 with the local signal outputted from the local oscillator 25, and outputs the result to the antenna 21 via the transmission and reception switch 22. The frequency band of the output signal of the first frequency converter 232 is the 3 GHz band or the 9 GHz band, for example.

The receiver 24 has a second frequency converter 241, an A/D converter 242, and a quadrature detector 243. The second frequency converter 241 converts the received signal outputted from the antenna 21 via the transmission and reception switch 22 into an intermediate frequency by mixing with the local signal outputted from the local oscillator 25, and outputs this result to the A/D converter 242.

The A/D converter 242 converts the analog received signal outputted from the second frequency converter 241 into a digital received signal, and outputs it to the quadrature detector 243.

The quadrature detector 243 subjects the received signal outputted from the A/D converter 242 to quadrature detection, and thereby produces an I (In-phase) signal and a Q (Quadrature) signal that differs in phase from the I signal by $\pi/2$. Here, the I signal is the real number part of a complex envelope signal of the received signal, while the Q signal is the imaginary number part of a complex envelope signal of the received signal. A complex envelope signal will hereinafter be called a complex received signal. The amplitude of this complex received signal is expressed by $(I^2+Q^2)^{1/2}$, and the phase of the complex received signal is expressed by $\tan^{-1}(Q/I)$. The I signal and Q signal produced as above are outputted to the Doppler velocity calculation device 3.

Doppler Velocity Calculation Device

Figure 2:
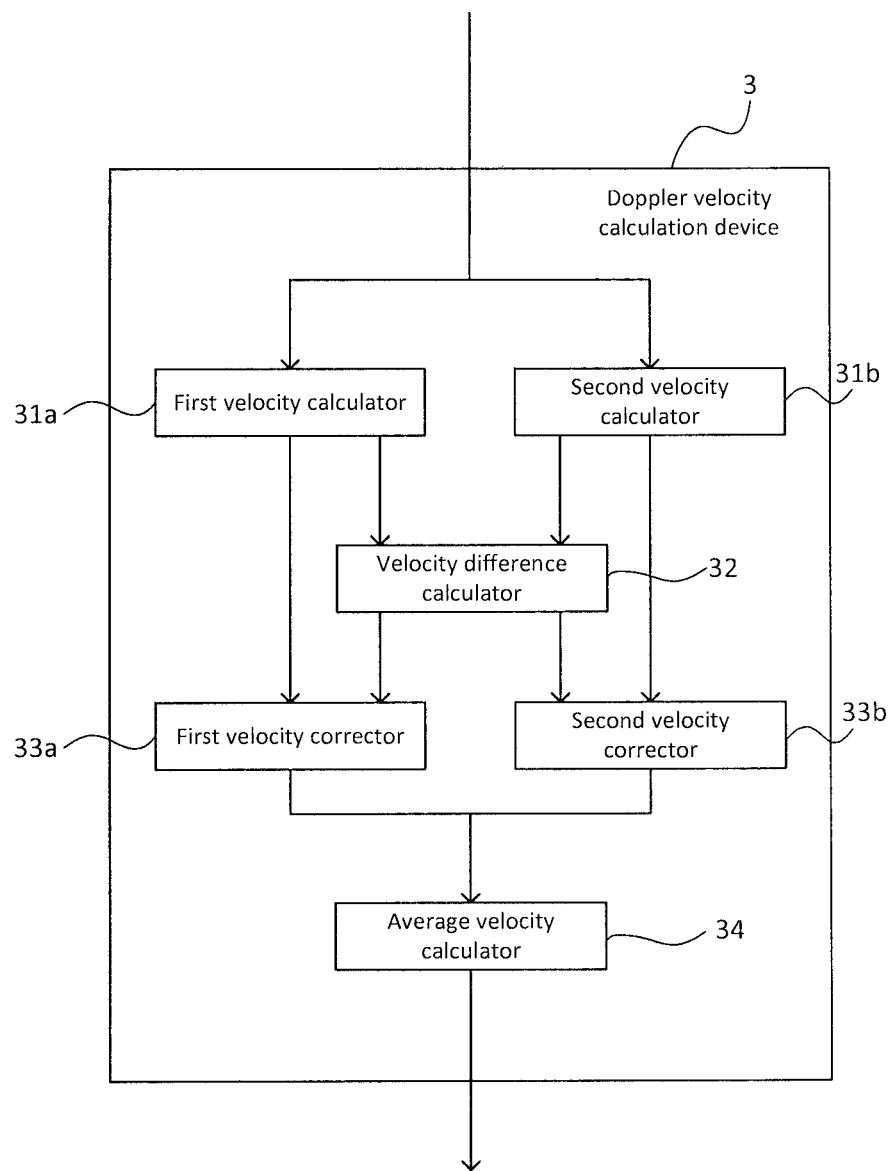
FIG. 2 is a block diagram of the configuration of the Doppler velocity calculation device in the radar device pertaining to an embodiment of the present invention.

FIG. 2 is a block diagram of the configuration of the Doppler velocity calculation device 3 pertaining to this embodiment. As shown in FIG. 2, the Doppler velocity calculation device 3 comprises a first velocity calculator 31a, a second velocity calculator 31b, a velocity difference calculator 32, a first velocity corrector 33a, a second velocity corrector 33b, and an average velocity calculator 34.

Figure 3:
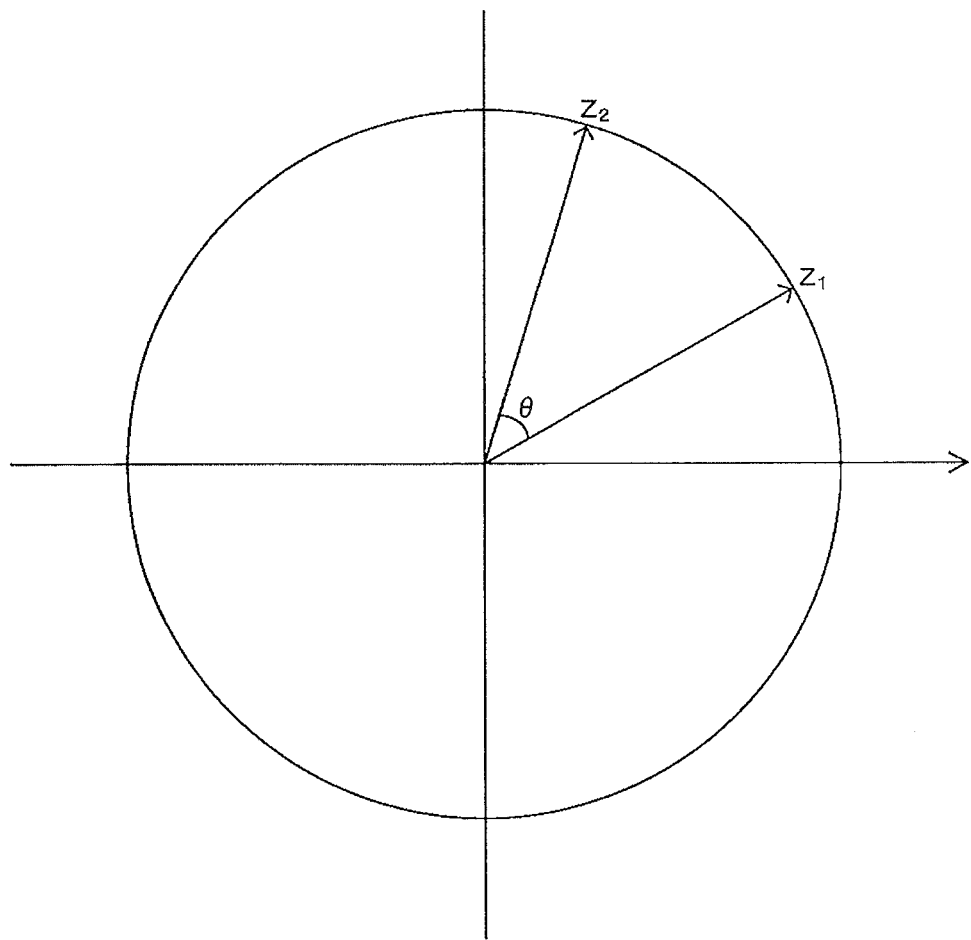
FIG. 3 shows polar coordinates indicating the phase difference between a complex received signal $Z_1$ and a complex received signal $Z_2$.

The first and second velocity calculators 31a and 31b calculate Doppler velocity based on the I and Q signals outputted from the quadrature detector 243. More precisely, the first velocity calculator 31a calculates a first Doppler velocity by using a pulse-pair method based on a first complex received signal obtained from a pulse signal transmitted at a first pulse repetition frequency. More specifically, as shown in FIG. 3, the first velocity calculator 31a calculates the phase difference $\theta 0$ between a first complex received signal $Z_1$ received at a certain distance, and the first complex received signal $Z_2$ obtained from the pulse signal sent next. The first complex received signal $Z_1$ and the first complex received signal $Z_2$ are signals received at the same distance. The first velocity calculator 31a then calculates a first Doppler velocity $V_{d1}$ based on the following formula (1), and outputs this first Doppler velocity $V_{d1}$ to the velocity difference calculator 32 and the first velocity corrector 33a.

$$V_{d1} = \lambda \theta / (4\pi T) \qquad (1)$$

Here, $\lambda$ is the wavelength of the pulse signal, and T is the repetition frequency of the pulse signal.

The second velocity calculator 31b calculates a second Doppler velocity $V_{d2}$ by the same method as the above-mentioned first velocity calculator 31a based on a second complex received signal obtained from a pulse signal sent at a second pulse repetition frequency. The second velocity calculator 31b outputs the calculated second Doppler velocity $V_{d2}$ to the velocity difference calculator 32 and the second velocity corrector 33b. The first Doppler velocity $V_{d1}$ calculated by the first velocity calculator 31a and the second Doppler velocity $V_{d2}$ calculated by the second velocity calculator 31b are uncorrected Doppler velocities, and not the Doppler velocity ultimately outputted by the radar device 1.

The velocity difference calculator 32 calculates the velocity difference $\Delta V$ between the first Doppler velocity $V_{d1}$ outputted from the first velocity calculator 31a and the second Doppler velocity $V_{d2}$ outputted from the second velocity calculator 31b. In this embodiment, the velocity difference calculator 32 calculates the velocity difference $\Delta V$ as the remainder $(V_{d1} - V_{d2})$ of subtracting the second Doppler velocity $V_{d2}$ from the first Doppler velocity $V_{d1}$. The velocity difference calculator 32 outputs the calculated velocity difference $\Delta V$ to the first velocity corrector 33a and the second velocity corrector 33b.

The first velocity corrector 33a performs folding correction on the first Doppler velocity $V_{d1}$ outputted from the first velocity calculator 31a based on the velocity difference $\Delta V$ outputted from the velocity difference calculator 32, and thereby calculates a first corrected Doppler velocity $V_{r1}$. Specifically, the first velocity corrector 33a determines a folding number $n_1$ of the first Doppler velocity $V_{d1}$ based on the velocity difference $\Delta V$, and uses this folding number $n_1$ to correct the first Doppler velocity $V_{d1}$ and calculate the first corrected Doppler velocity $V_{r1}$. The first velocity corrector 33a outputs the calculated first corrected Doppler velocity $V_{r1}$ to the average velocity calculator 34.

Figure 4:
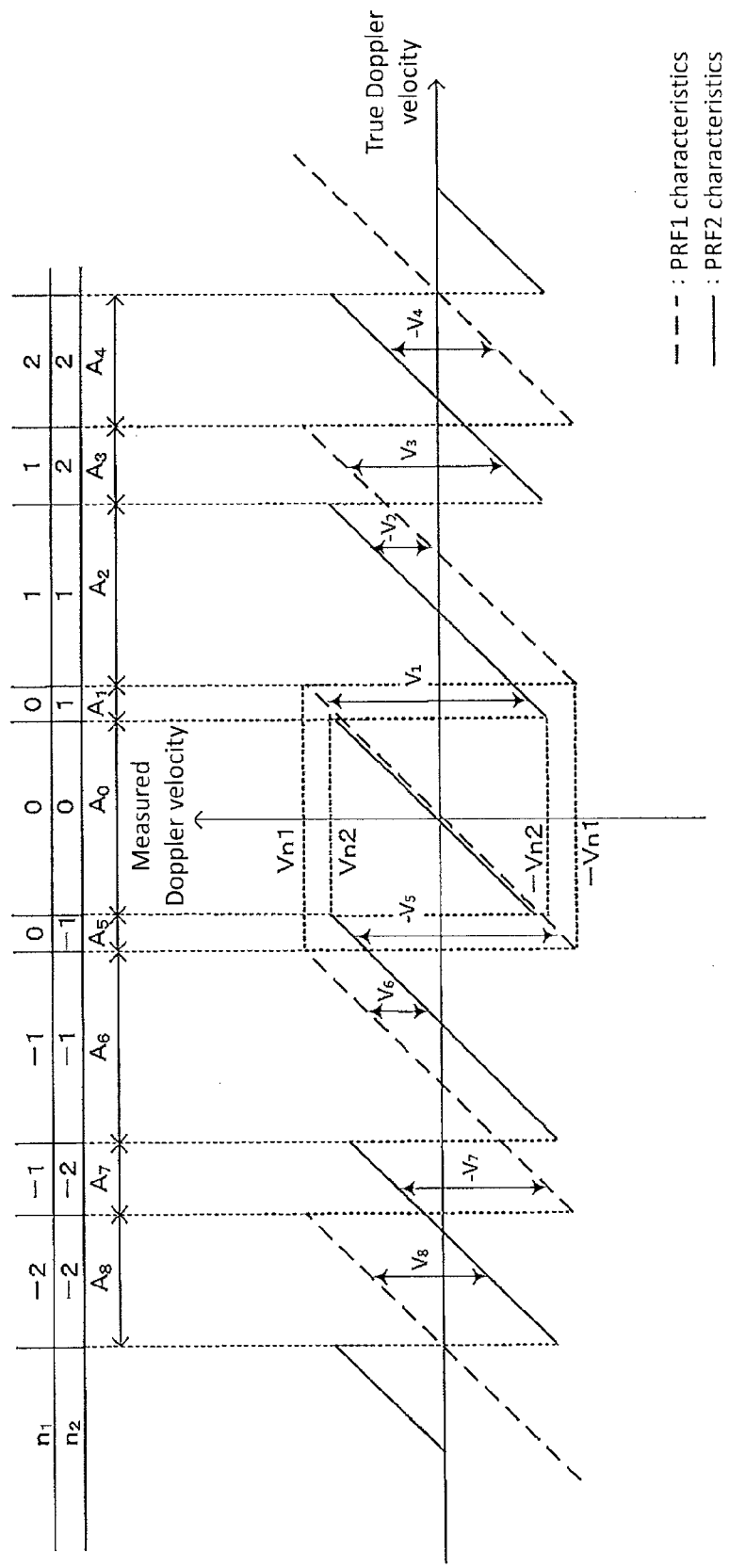
FIG. 4 is a graph of the relation between the measured Doppler velocity and the true Doppler velocity.

More precisely, the first velocity corrector 33a refers to a graph of the relation between the measured Doppler velocity and the true Doppler velocity (shown in FIG. 4), and determines the folding number $n_1$ based on the velocity difference $\Delta V$. The measured Doppler velocity corresponds to the first Doppler velocity $V_{d1}$ or the second Doppler velocity $V_{d2}$ in this embodiment, and the true Doppler velocity corresponds to the first corrected Doppler velocity $V_{r1}$ or a second corrected Doppler velocity $V_{r2}$ in this embodiment. The graph shown in FIG. 4 is unambiguously set by determining two pulse repetition frequencies, and includes information indicating the correlation between the velocity difference $\Delta V$ and folding numbers $n_1$ and $n_2$. Specifically, the first velocity corrector 33a determines the folding number $n_1$ from the velocity difference $\Delta V$ based on corresponding information indicating the correlation between the preset velocity difference $\Delta V$ and the folding number $n_1$.

When the folding number $n_1$ is determined, the first velocity corrector 33a calculates the first corrected Doppler velocity $V_{r1}$ based on the following formula (2).

$$V_{r1} = V_{d1} + 2n_1 \cdot V_{n1} \qquad (2)$$

Here, $V_{n1}$ is the highest Doppler velocity that can be calculated by the first velocity calculator 31a, that is, the Nyquist velocity at the first pulse repetition frequency, and is expressed by the following formula (3).

$$V_{n1} = \lambda \cdot f_1 / 4 \qquad (3)$$

Here, $f_1$ is the first pulse repetition frequency.

The second velocity corrector 33b calculates the second corrected Doppler velocity $V_{r2}$ by performing folding correction on the second Doppler velocity $V_{d2}$ outputted from the second velocity calculator 31b based on the velocity difference $\Delta V$ outputted from the velocity difference calculator 32. Specifically, the second velocity corrector 33b determines the folding number $n_2$ of the second Doppler velocity $V_{d2}$ based on the velocity difference $\Delta V$, and uses this folding number $n_2$ to correct the second Doppler velocity $V_{d2}$ and calculate the second corrected Doppler velocity $V_{r2}$. The second velocity corrector 33b outputs the calculated second corrected Doppler velocity $V_{r2}$ to the average velocity calculator 34.

More precisely, the second velocity corrector 33b calculates the second corrected Doppler velocity $V_{r2}$ in the same manner as with the first velocity corrector 33a discussed above. The second velocity corrector 33b calculates the second corrected Doppler velocity $V_{r2}$ based on the following formula (4).

$$V_{r2} = V_{d2} + 2n_2 \cdot V_{n2} \qquad (4)$$

Here, $V_{n2}$ is the highest Doppler velocity that can be calculated by the second velocity calculator 31b, that is, the Nyquist velocity at the second pulse repetition frequency, and is expressed by the following formula (5).

$$V_{n2} = \lambda \cdot f_2 / 4 \qquad (5)$$

Here, $f_2$ is the second pulse repetition frequency.

A few examples of the method for determining the folding number from the velocity difference $\Delta V$ will now be described in specific terms through reference to FIG. 4. First, the first velocity corrector 33a determines the corresponding region based on the velocity difference $\Delta V$ outputted from the velocity difference calculator 32. For example, if the velocity difference $\Delta V$ is $-V_2$, the first velocity corrector 33a determines the corresponding region to be $A_2$. Since the folding number of the first Doppler velocity in this region $A_2$ is 1 (based on FIG. 4), the first velocity corrector 33a determines the folding number $n_1$ to be 1. If the velocity difference $\Delta V$ is $V_6$, the first velocity corrector 33a determines the corresponding region to be $A_6$. Since the folding number $n_1$ of the first Doppler velocity in this region $A_6$ is $-1$ (based on FIG. 4), the first velocity corrector 33a determines the folding number $n_1$ to be $-1$.

Thus, the first velocity corrector 33a determines the corresponding folding number $n_1$ based on the magnitude of the velocity difference $\Delta V$ and whether it is positive or negative. Similarly, the second velocity corrector 33b also determines the corresponding folding number $n_2$ based on the magnitude of the velocity difference $\Delta V$ and whether it is positive or negative.

The average velocity calculator 34 calculates the average for the first corrected Doppler velocity $V_{r1}$ outputted from the first velocity corrector 33a and the second corrected Doppler velocity $V_{r2}$ outputted from the second velocity corrector 33b, as an average velocity $V_{ave}$. More specifically, the average velocity calculator 34 calculates the average velocity $V_{ave}$ from the following formula (6). The average velocity calculator 34 outputs the calculated average velocity $V_{ave}$ to the display device 4.

$$V_{ave} = (V_{r1} + V_{r2}) / 2 \qquad (6)$$

Display Device

The display device 4 displays the average velocity $V_{ave}$ outputted from the average velocity calculator 34.

Velocity Calculation Method

Figure 5:
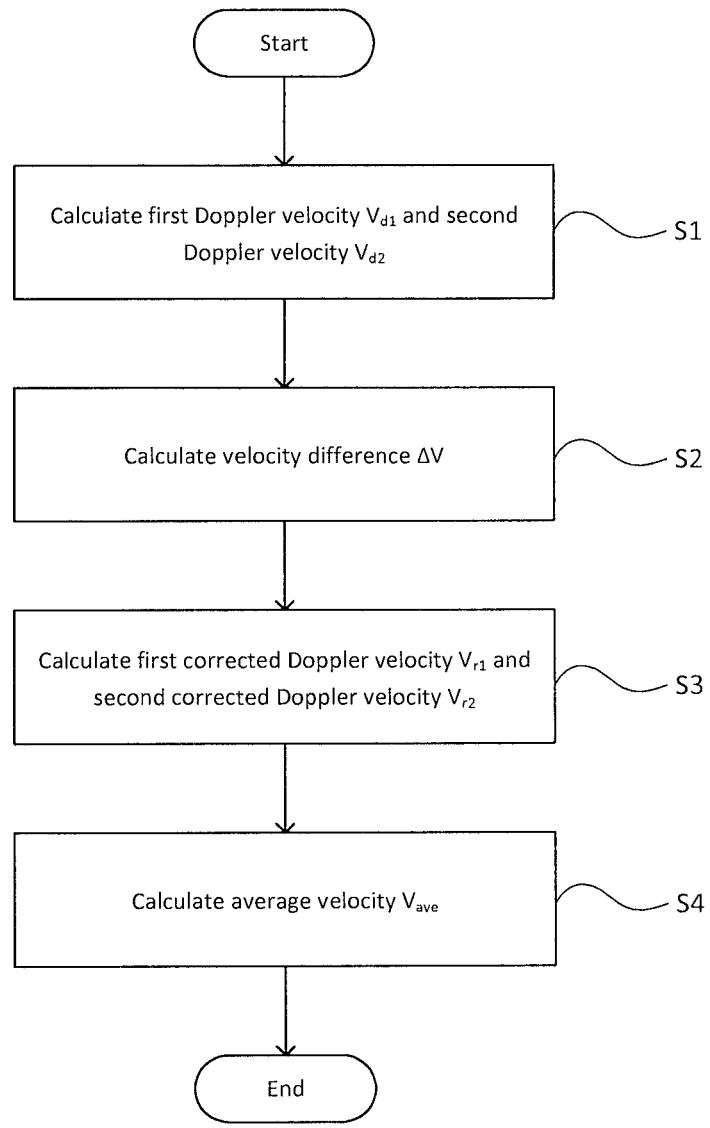
FIG. 5 is a flowchart of an example of the procedure involved in calculating velocity with a Doppler velocity calculation device pertaining to an embodiment the present invention.

The method for calculating the Doppler velocity of a target using the radar device 1 configured as above will be described through reference to FIG. 5. FIG. 5 is a flowchart of an example of the procedure involved in calculating Doppler velocity with the radar device pertaining to this embodiment.

As shown in FIG. 5, the first Doppler velocity $V_{d1}$ is calculated by the first velocity calculator 31a, and the second Doppler velocity $V_{d2}$ is calculated by the second velocity calculator 31b (step S1).

More precisely, the first velocity calculator 31a calculates the first Doppler velocity $V_{d1}$ by using a pulse-pair method based on a first complex received signal obtained from a pulse signal transmitted at a first pulse repetition frequency. Similarly, the second velocity calculator 31b calculates the second Doppler velocity $V_{d2}$ by using a pulse-pair method based on a second complex received signal obtained from a pulse signal transmitted at a second pulse repetition frequency. The first Doppler velocity $V_{d1}$ and second Doppler velocity $V_{d2}$ thus calculated are outputted to the velocity difference calculator 32, the first velocity corrector 33a, and the second velocity corrector 33b.

Then, the velocity difference calculator 32 calculates the velocity difference $\Delta V$ from the difference of the first Doppler velocity $V_{d1}$ and the second Doppler velocity $V_{d2}$ (step S2). More specifically, the velocity difference calculator 32 calculates the velocity difference $\Delta V$ by subtracting the second Doppler velocity $V_{d2}$ from the first Doppler velocity $V_{d1}$ (that is, calculating $V_{d1}-V_{d2}$). The velocity difference calculator 32 outputs the calculated velocity difference $\Delta V$ to the first velocity corrector 33a and the second velocity corrector 33b.

Then, the first velocity corrector 33a calculates the first corrected Doppler velocity $V_{r1}$ by subjecting the first Doppler velocity $V_{d1}$ to folding correction, and the second velocity corrector 33b calculates the second corrected Doppler velocity $V_{r2}$ by subjecting the second Doppler velocity $V_{d2}$ to folding correction (step S3).

More precisely, the first velocity corrector 33a refers to the graph in FIG. 4 to determine the folding number $n_1$ based on the velocity difference $\Delta V$ outputted from the velocity difference calculator 32. The first velocity corrector 33a then calculates the first corrected Doppler velocity $V_{r1}$ from the formula (2) given above. Similarly, the second velocity corrector 33b determines the folding number $n_2$ based on the velocity difference $\Delta V$ outputted from the velocity difference calculator 32. The second velocity corrector 33b then calculates the second corrected Doppler velocity $V_{r2}$ from the formula (4) given above. The first corrected Doppler velocity $V_{r1}$ and second corrected Doppler velocity $V_{r2}$ calculated as above are outputted to the average velocity calculator 34.

Then, the average velocity calculator 34 calculates the average velocity $V_{ave}$ based on the first corrected Doppler velocity $V_{r1}$ and the second corrected Doppler velocity $V_{r2}$ (step S4). More specifically, the average velocity calculator 34 calculates the average velocity $V_{ave}$ by calculating $(V_{r1}+V_{r2})/2$.

With the radar device 1 pertaining to the embodiment described above, not only can the first corrected Doppler velocity $V_{r1}$ be calculated, but also the second corrected Doppler velocity $V_{r2}$. Since the amount of data about Doppler velocity that is outputted is therefore twice the amount in the past, Doppler velocity can be calculated at higher accuracy.

An embodiment of the present invention was described above, but the present invention is not limited to or by this embodiment, and various modifications are possible without departing from the gist of the invention.

(1) For example, in the above embodiment, the first velocity calculator 31a and the second velocity calculator 31b calculated the first and second Doppler velocities $V_{d1}$ and $V_{d2}$, respectively, by pulse-pair method, but the method for calculating the first and second Doppler velocities is not limited to this. For instance, the first and second velocity calculators 31a and 31b can calculate the Doppler velocities $V_{d1}$ and $V_{d2}$ by the FFT (Fast Fourier Transform) method. With the FFT method, the first velocity calculator 31a converts a first complex received signal into a frequency domain by Fourier transform processing, and the peak of this frequency spectrum is read to calculate the first Doppler velocity $V_{d1}$. The second velocity calculator 31b calculates the second Doppler velocity $V_{d2}$ by subjecting a second complex received signal to the same processing.

(2) Also, in the above embodiment, the velocity difference calculator 32 calculated the velocity difference $\Delta V$ by subtracting the second Doppler velocity $V_{d2}$ from the first Doppler velocity $V_{d1}$, but this is not the only option. For example, the velocity difference calculator 32 can calculate the velocity difference $\Delta V$ by subtracting the first Doppler velocity $V_{d1}$ from the second Doppler velocity $V_{d2}$. In this case, the positive and negative are reversed for the velocity difference $\Delta V$ in the graph in FIG. 4.

(3) Also, in the above embodiment, the radar device 1 finally outputted the average velocity $V_{ave}$ calculated by the average velocity calculator 34, but this is not the only option. For example, the radar device 1 can finally output the first and second corrected Doppler velocities $V_{r1}$ and $V_{r2}$ even if it is not equipped with the average velocity calculator 34.

(4) Also, in the above embodiment, the first and second velocity calculators 31a and 31b calculated the first and second Doppler velocities $V_{d1}$ and $V_{d2}$, but the configuration can also be such that the first and second Doppler velocities $V_{d1}$ and $V_{d2}$ are not calculated, as follows.

Figure 6:
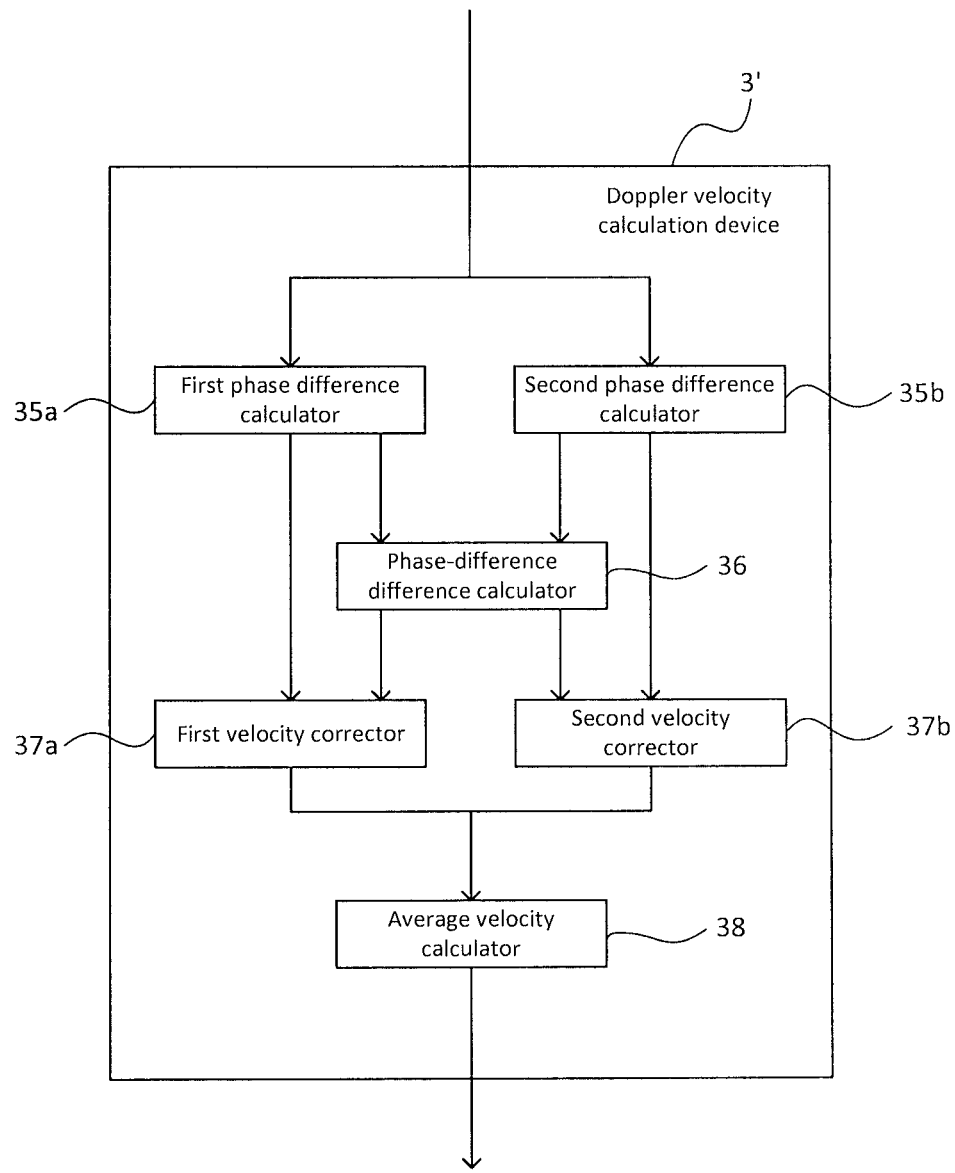
FIG. 6 is a block diagram of the configuration of the Doppler velocity calculation device pertaining to a modification example.

FIG. 6 is a block diagram of the configuration of a Doppler velocity calculation device 3' pertaining to a modification example. As shown in FIG. 6, the Doppler velocity calculation device 3' pertaining to this modification example comprises a first phase difference calculator 35a, a second phase difference calculator 35b, a phase-difference difference calculator 36, a first velocity corrector 37a, a second velocity corrector 37b, and an average velocity calculator 38.

The first phase difference calculator 35a calculates a first phase difference $\theta_{d1}$ by the same method as the first velocity calculator 31a in the above embodiment, based on a first complex received signal. The second phase difference calculator 35b similarly calculates a second phase difference $\theta_{d2}$ based on a second complex received signal. The first phase difference $\theta_{d1}$ and second phase difference $\theta_{d2}$ are outputted to the phase-difference difference calculator 36, the first velocity corrector 37a, and the second velocity corrector 37b.

The phase-difference difference calculator 36 calculates a phase-difference difference $\Delta\theta$, which is the difference between the first phase difference $\theta_{d1}$ and the second phase difference $\theta_{d2}$. More specifically, the phase-difference difference calculator 36 calculates the phase-difference difference $\Delta\theta$ by subtracting the second phase difference $\theta_{d2}$ from the first phase difference $\theta_1$, and outputs this phase-difference difference $\Delta\theta$ to the first velocity corrector 37a and the second velocity corrector 37b.

Figure 7:
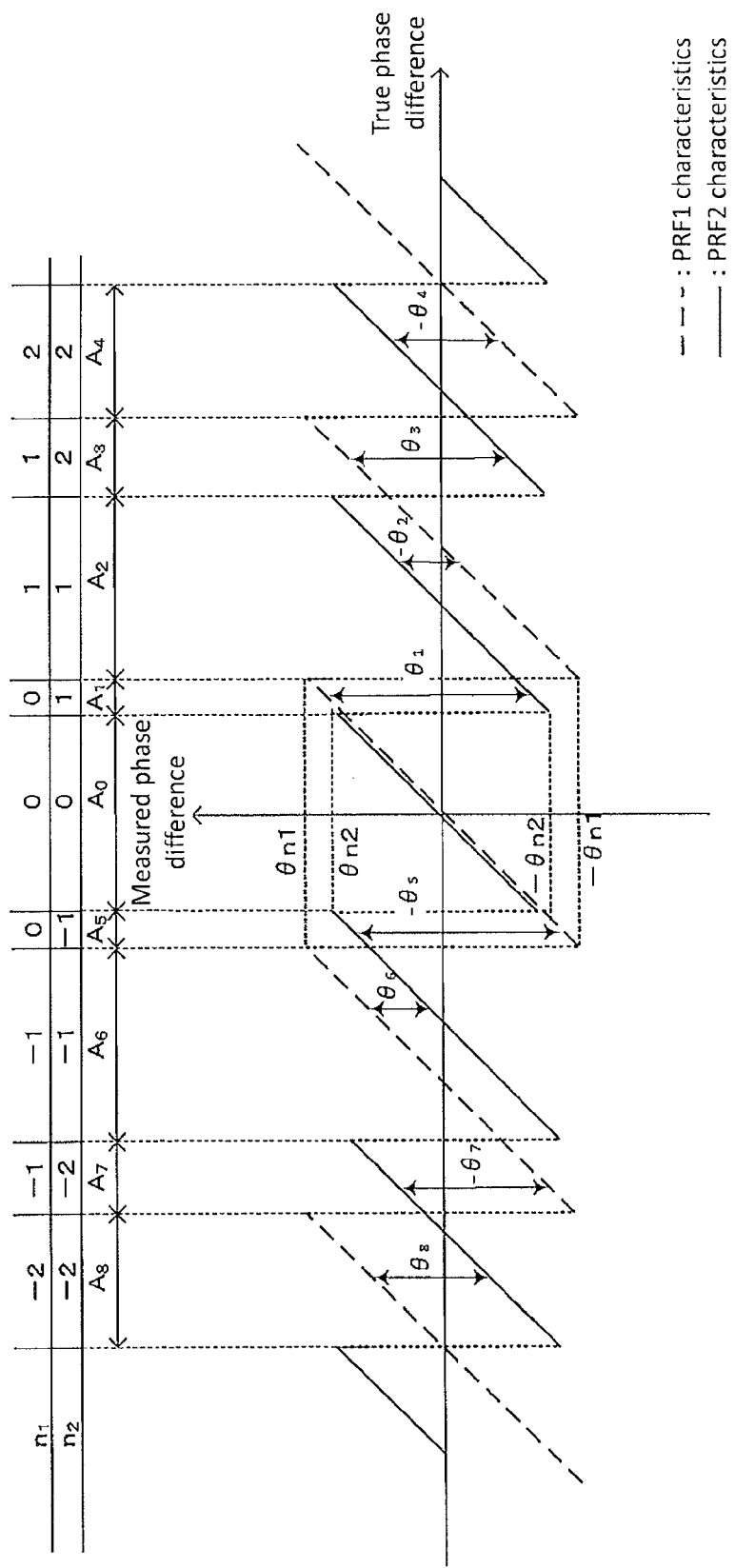
FIG. 7 is a graph of the relation between the measured phase difference and the true phase difference.

The first velocity corrector 37a refers to a graph of the relation between the measured phase difference and the true phase difference (as shown in FIG. 7), and determines a first phase rotation number $n_1$, which is the phase rotation number of the first complex received signal. The first velocity corrector 37a then uses the following formula (7) to calculate a first corrected phase difference $\theta_{r1}$, which is the true phase difference, based on the first phase difference $\theta_{d1}$ and the first phase rotation number $n_1$.

$$\theta_{r1} = \theta_{d1} + 2n_1 \cdot \theta_{n1} \qquad (7)$$

Here, $\theta_{n1}$ is the greatest phase difference that can be calculated by the first phase difference calculator 35a. The first velocity corrector 37a then calculates the first corrected Doppler velocity $V_{r1}$ by pulse-pair method (that is, the following formula (8)) based on the calculated first corrected phase difference $\theta_{n1}$.

$$V_{r1} = \lambda \theta_{r1}/(4\pi T) \qquad (8)$$

Similarly, the second velocity corrector 37b determines a second phase rotation number $n_2$, which is the phase rotation number of the second complex received signal, calculates a second corrected phase difference $\theta_{r2}$, which is the true phase difference, and calculates the second corrected Doppler velocity $V_{r2}$ by pulse-pair method.

The average velocity calculator 38 calculates the average velocity $V_{ave}$ between the first corrected Doppler velocity $V_{r1}$ and the second corrected Doppler velocity $V_{r2}$. More specifically, the average velocity calculator 38 calculates $(V_{r1}+V_{r2})/2$, and outputs this as the average $V_{ave}$.

Working Examples

The present invention will now be described in more specific terms by giving a working examples and comparative examples, but the present invention is not limited to or by these examples.

In the working example, the same radar device 1 as in the above embodiment was used, and the Doppler velocity was outputted from the average velocity calculator 34. The Doppler velocity outputted in the working example corresponds to the average velocity $V_{ave}$ in the above embodiment.

Figure 8:
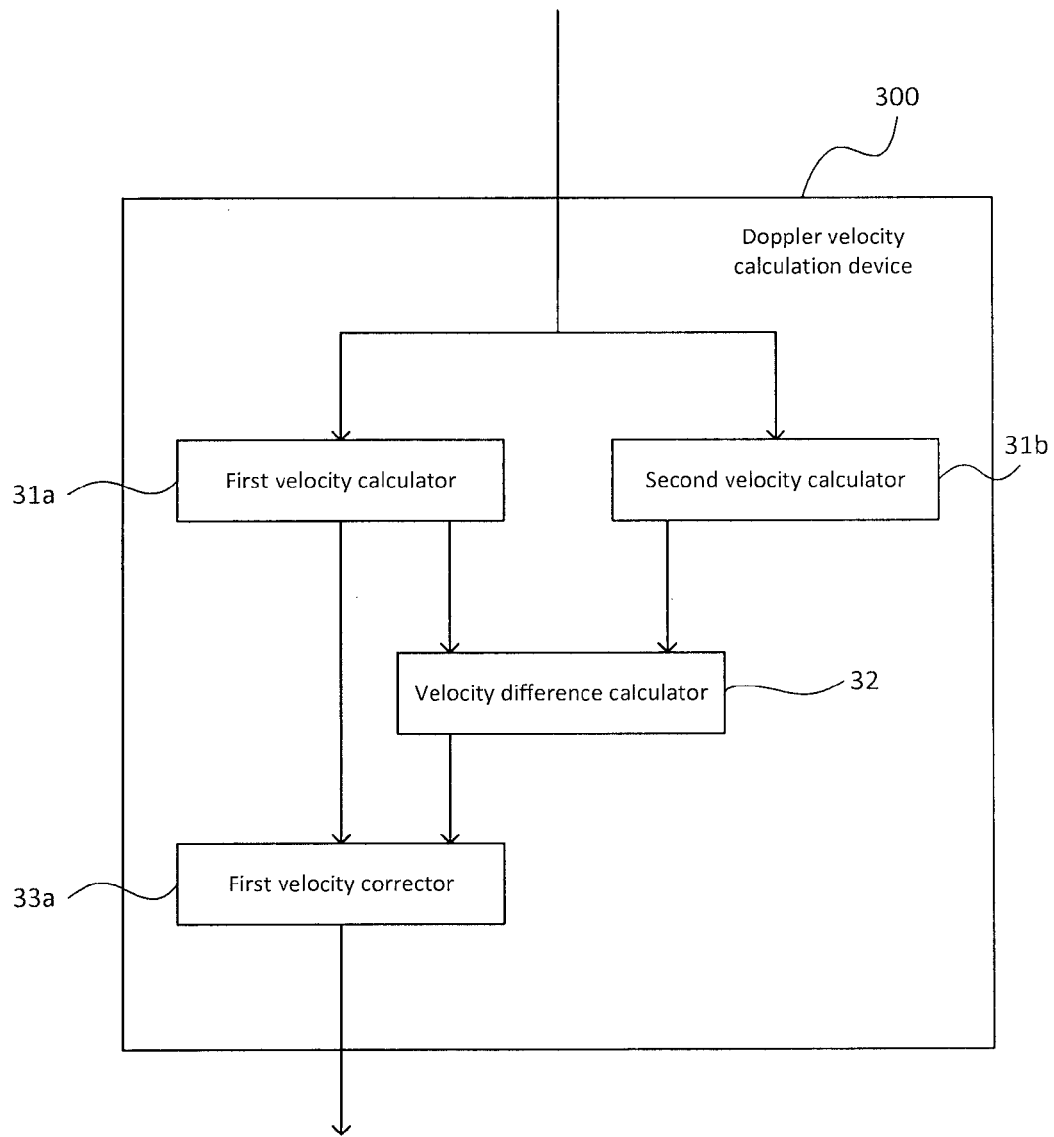
FIG. 8 is a block diagram of the configuration of the Doppler velocity calculation device in a radar device pertaining to Modification Example 1.

As shown in FIG. 8, in Comparative Example 1, a radar device comprising a Doppler velocity calculation device 300, which is the same as the Doppler velocity calculation device 3 in the above embodiment except that the second velocity corrector 33b and the average velocity calculator 34 are eliminated, is used to output the Doppler velocity from the first velocity corrector 33a. The Doppler velocity outputted in Comparative Example 1 corresponds to the first corrected Doppler velocity $V_{r1}$ in the above embodiment.

Figure 9:
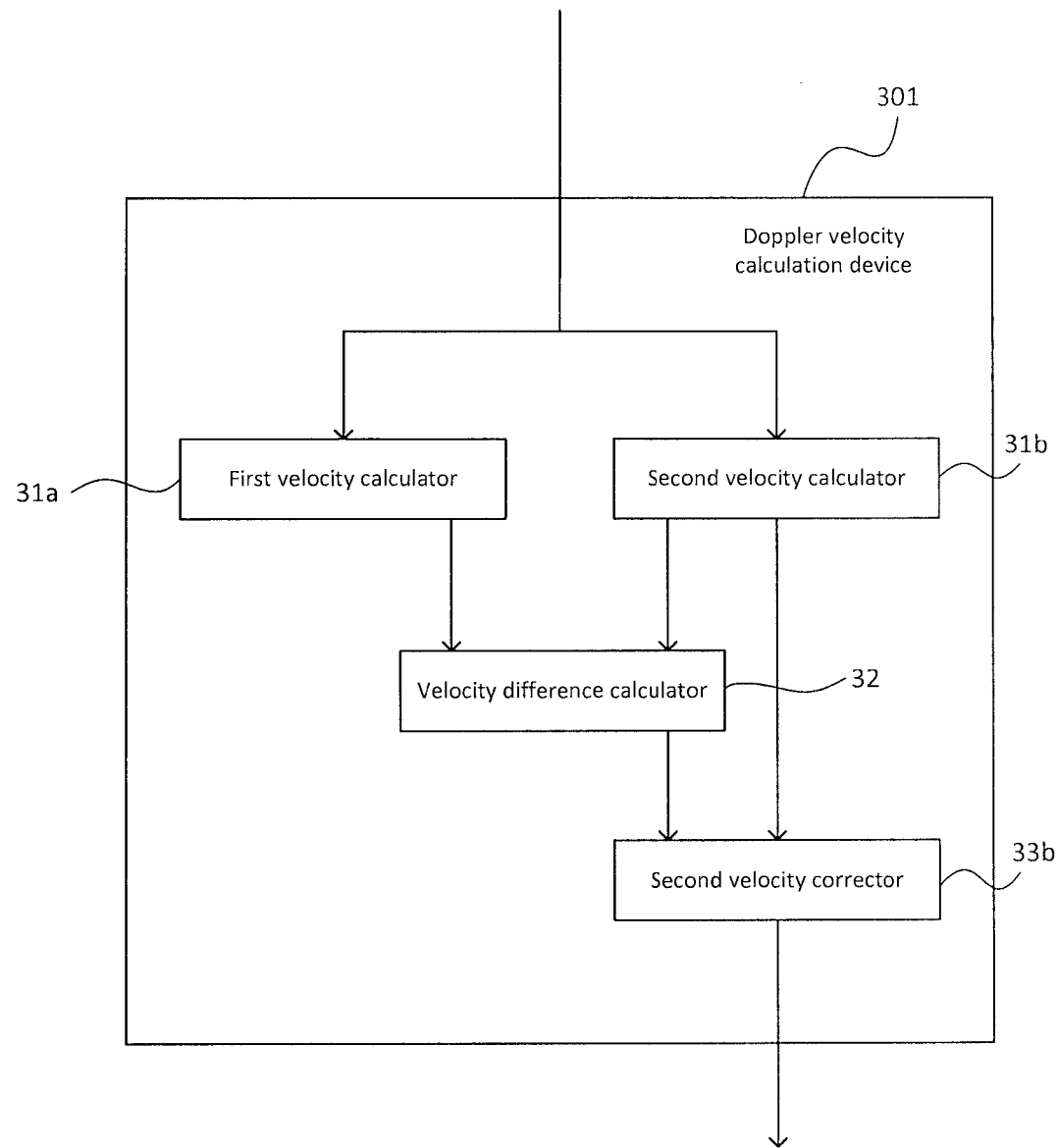
FIG. 9 is a block diagram of the configuration of the Doppler velocity calculation device in a radar device pertaining to Modification Example 2.

As shown in FIG. 9, in Comparative Example 2, a radar device comprising a Doppler velocity calculation device 301, which is the same as the Doppler velocity calculation device 3 in the above embodiment except that the first velocity corrector 33a and the average velocity calculator 34 are eliminated, is used to output the Doppler velocity from the second velocity corrector 33b. The Doppler velocity outputted in Comparative Example 2 corresponds to the second corrected Doppler velocity $V_{r2}$ in the above embodiment.

The Doppler velocity of three vessels 1 to 3 were calculated at nine points in the working example and Comparative Examples 1 and 2, and the average Doppler velocity, the standard deviation, and the variance for the nine points thus calculated are shown in Table 1. The first pulse repetition frequency was 2000 Hz, and the second pulse repetition frequency was 1600 Hz. It can be seen from Table 1 that there is less variance in the working example than in Comparative Examples 1 and 2, and that the Doppler velocity can be calculated more accurately.

TABLE 1

|   |   | Working Example | Comparative Example 1 | Comparative Example 2 |
|---|---|---|---|---|
| A | Average velocity (m/s) | −5.617 | −5.746 | −5.489 |
|   | Standard deviation | 0.171 | 0.203 | 0.237 |
|   | Variance | 0.029 | 0.041 | 0.056 |
| B | Average velocity (m/s) | 4.560 | 4.632 | 4.489 |
|   | Standard deviation | 0.095 | 0.222 | 0.137 |
|   | Variance | 0.009 | 0.049 | 0.019 |
| C | Average velocity (m/s) | −8.196 | −8.237 | −8.155 |
|   | Standard deviation | 0.142 | 0.437 | 0.329 |
|   | Variance | 0.020 | 0.191 | 0.108 |

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:
1. A radar device comprising:
   a transmitter configured to transmit pulse signals at two or more different pulse repetition frequencies; and
   a processor configured to calculate a first Doppler velocity based on a first received signal received from a target as a reflected wave of the pulse signals transmitted at a first pulse repetition frequency, calculate a second Doppler velocity based on a second received signal received from the target as a reflected wave of the pulse signals transmitted at a second pulse repetition frequency, modify the first Doppler velocity by determining a velocity difference between the first Doppler velocity and the second Doppler velocity and performing folding correction on the first Doppler velocity based on the velocity difference to generate a first corrected Doppler velocity, modify the second Doppler velocity by performing folding correction on the second Doppler velocity based on the velocity difference to generate a second corrected Doppler velocity, and generate a display control signal based on the first corrected Doppler velocity and the second corrected Doppler velocity to control a display to display a velocity of the target.

2. The radar device according to claim 1, wherein the processor is further configured to calculate an average velocity based on the first corrected Doppler velocity and the second corrected Doppler velocity to generate the display control signal based on the average velocity.

3. The radar device according to claim 2, wherein the transmitter is further configured to transmit the pulse signals at exactly two different pulse repetition frequencies.

4. The radar device according to claim 3, wherein the transmitter is further configured to alternately transmit the pulse signals that are transmitted at the first pulse repetition frequency and the pulse signals that are transmitted at the second pulse repetition frequency.

5. The radar device according to claim 4, wherein the processor is further configured to calculate corresponding one of the first Doppler velocity and the second Doppler velocity by pulse-pair method.

6. A Doppler velocity calculation method comprising:
transmitting, from a radar transmitter, pulse signals at two or more different pulse repetition frequencies;
calculating a first Doppler velocity based on a first received signal received from a target as a reflected wave of the pulse signals transmitted at a first pulse repetition frequency;
calculating a second Doppler velocity based on a second received signal received from the target as a reflected wave of the pulse signals transmitted at a second pulse repetition frequency;
modifying the first Doppler velocity by determining a velocity difference between the first Doppler velocity and the second Doppler velocity and performing folding correction on the first Doppler velocity based on the velocity difference to generate a first corrected Doppler velocity;
modifying the second Doppler velocity by performing folding correction on the second Doppler velocity based on the velocity difference to generate a second corrected Doppler velocity; and
generating a display control signal based on the first corrected Doppler velocity and the second corrected Doppler velocity to control a display to display a velocity of the target.

* * * * *